United States Patent
Fawer (10) Patent No.: US 8,600,894 B2
(45) Date of Patent: Dec. 3, 2013

(54) THREE-STAGE, DOUBLE BLIND CREDIT RATING OF SECURITIES

(76) Inventor: Mark S. Fawer, New York, NY (US)

( * ) Notice: Subject to any disclaimer, the term of this patent is extended or adjusted under 35 U.S.C. 154(b) by 329 days.

(21) Appl. No.: 13/040,999

(22) Filed: Mar. 4, 2011

(65) Prior Publication Data

US 2012/0227099 A1    Sep. 6, 2012

(51) Int. Cl.
*G06Q 40/00*    (2012.01)

(52) U.S. Cl.
USPC ............... 705/50; 705/39; 705/38; 705/35

(58) Field of Classification Search
None
See application file for complete search history.

(56) References Cited

U.S. PATENT DOCUMENTS

| | | | |
|---|---|---|---|
| 5,862,223 A | 1/1999 | Walker et al. | |
| 5,966,700 A | 10/1999 | Gould et al. | |
| 6,088,686 A | 7/2000 | Walker et al. | |
| 6,249,775 B1 | 6/2001 | Freeman et al. | |
| 6,952,769 B1 | 10/2005 | Dubey et al. | |
| 6,970,870 B2 | 11/2005 | Dweck et al. | |
| 7,140,044 B2 | 11/2006 | Redlich et al. | |
| 7,590,585 B2 | 9/2009 | Agarwal et al. | |
| 7,653,641 B2 | 1/2010 | Theissen et al. | |
| 7,729,979 B2 | 6/2010 | Lee | |
| 7,739,171 B2 | 6/2010 | Tilton | |
| 7,769,681 B2 | 8/2010 | Misraje et al. | |
| 7,788,200 B2 * | 8/2010 | Crivat et al. | 706/46 |
| 8,015,107 B2 * | 9/2011 | Kornegay et al. | 705/38 |
| 8,442,886 B1 * | 5/2013 | Haggerty et al. | 705/35 |
| 8,478,673 B2 * | 7/2013 | Haggerty et al. | 705/35 |
| 2002/0067308 A1 * | 6/2002 | Robertson | 342/357.17 |
| 2002/0095369 A1 | 7/2002 | Kaplan et al. | |
| 2003/0105708 A1 | 6/2003 | Lee | |
| 2003/0110045 A1 | 6/2003 | Kehrli et al. | |
| 2003/0225667 A1 | 12/2003 | Sato | |
| 2004/0122772 A1 | 6/2004 | Schirmer | |
| 2005/0222869 A1 | 10/2005 | Bealke et al. | |
| 2005/0251475 A1 | 11/2005 | Sato | |
| 2006/0004654 A1 * | 1/2006 | Kornegay et al. | 705/39 |
| 2006/0155573 A1 | 7/2006 | Hartunian | |
| 2007/0033064 A1 | 2/2007 | Abrahamsohn | |
| 2008/0021804 A1 | 1/2008 | Deckoff | |
| 2009/0201768 A1 * | 8/2009 | Adams | 368/10 |
| 2010/0063921 A1 | 3/2010 | Flaherty | |
| 2010/0094758 A1 | 4/2010 | Chamberlain et al. | |

(Continued)

OTHER PUBLICATIONS

"Borrower Guide to CMBS" Mortgage Bankers Association; Commercial Mortgage Securities Association; 2004; pp. 1-14.

(Continued)

*Primary Examiner* — Evens J Augustin
(74) *Attorney, Agent, or Firm* — Carter, DeLuca, Farrell & Schmidt, LLP; Russell S. Salerno (57) ABSTRACT

Disclosed is a computer-implemented system and method for rating an asset, and, in embodiments, a system and method for performing a double-blind, three stage credit rating of a securitized instrument, such as without limitation, a commercial mortgage backed security or an asset thereof. The disclosed method utilizes a secure database structure which trifurcates information relating to the asset being rated into first, second, and third analytical stages. Asset information is distributed such that analysts at each stage have access to only that information which is relevant to the scope of the particular analytical stage being performed, while irrelevant and prejudicial information is withheld from the analyst. Unique access tokens are employed to control access to stage data and to maintain the integrity of the analytical process.

20 Claims, 5 Drawing Sheets

(56) References Cited

U.S. PATENT DOCUMENTS

| | | | |
|---|---|---|---|
| 2010/0169209 A1* | 7/2010 | Kornegay et al. | 705/38 |
| 2011/0029427 A1* | 2/2011 | Haggerty et al. | 705/38 |
| 2011/0131131 A1* | 6/2011 | Griffin et al. | 705/38 |
| 2012/0066106 A1* | 3/2012 | Papadimitriou | 705/35 |
| 2012/0227099 A1* | 9/2012 | Fawer | 726/9 |
| 2012/0265670 A1* | 10/2012 | Abiola et al. | 705/38 |

OTHER PUBLICATIONS

"CMBS Rating Methodology and Assumptions for Conduit/Fusion Pools"; Standard & Poors; Nov. 3, 2010; pp. 1-19.

"ABS—General Methodology and Assumptions for Rating U.S. ABS Credit Card Securitizations"; Standard & Poors; Apr. 19, 2010; pp. 1-22.

"ABS: Advance Notice of proposed Criteria Change: Methodologies and Assumptions for Rating U.S. Small Business Loan Securitizations"; Standard & Poors; Jun. 2, 2010; pp. 1-2.

"ABS: Methodology and Assumptions for Rating Short-Term U.S. Money Market-Eligible Notes Backed by Credit Card Receivables"; Standard & Poors; Jul. 2, 2009; pp. 1-2.

* cited by examiner

THREE-STAGE, DOUBLE BLIND CREDIT RATING OF SECURITIES

BACKGROUND

1. Technical Field

The present disclosure relates generally to securities information technology systems, and more particularly, to a computerized system and method for rating an underlying asset of a securitized instrument, such as, without limitation, a commercial mortgage-backed security.

2. Background of Related Art

A security is a financial instrument having a value based on the value of one or more underlying assets. Securities may be characterized by the underlying asset type, e.g., debt securities (e.g., bonds, mortgages, commercial paper, and loans), equity securities (e.g., shares of common stocks), and derivative contracts (e.g., forwards, futures, options and swaps). However, in practice, any type of asset can be pooled into a security. The assets which comprise a security may be selected in part upon the investment goals of the security, e.g., risk level, income production, capital appreciation, tax minimization, short- or long-term financial investment, whether an indefinite term (an open-ended security) or a fixed maturity date (a closed-ended security) is desired, and so forth. Pooling assets into a security instrument may also reduce the risks associated with any one underlying asset by spreading risk among the plurality of assets held in the security. In this manner, an unfavorable return on one asset may be offset by favorable returns on other assets held within the security. Securities also enable smaller or individual investors to participate in the market which would otherwise require capital outlays beyond the means of such investors.

A commercial mortgage-backed security (CMBS) is a type of security typically having as its assets a pool of mortgages held on commercial real estate properties, such as without limitation, office and apartment buildings, hotels, warehouses, industrial parks, and retail centers and malls. A single CMBS may include many individual mortgage loans of varying size, property type and location. The selected commercial mortgages are pooled and transferred to a trust. In turn, the trust issues a series of bonds that may vary in investment grade, yield, duration, and payment priority. The bonds are then offered to investors, who may purchase such bonds based on the desired level of risk, yield, and duration sought. A CMBS can be attractive to investors, since commercial real estate mortgages are typically more rigidly structured than residential mortgages and consequently carry less risk of uncompensated prepayment, or foreclosure.

Financial analysts are commonly employed to evaluate the merits of an asset being considered for inclusion within a security instrument, using manual analysis and, more recently, computer-aided analysis. Analysts may use standardized and/or proprietary techniques to study myriad properties of applicants, such as asset class, asset value, financial ratios (e.g., debt yield, debt service coverage, and loan-to-value), rate of return, beta (e.g., a correlation between an individual asset and a universe of related assets), risk factors, and creditworthiness. In the case of a CMBS, an analyst may consider such factors as location, identities of the mortgagor and/or mortgagee, credit history of the mortgagor, demographics, comparable property values (e.g., "comps"), tenancy data, and so forth. While ideally these factors are applied in an objective manner, the biases and preconceptions of an analyst may color the asset evaluation process, which may result in less than optimal accuracy of the rating of the securitized instrument. Asset rating may be conducted on behalf of an "applicant" or "issuer", which may be an underwriting bank or other entity engaged in the securitization of the loans and assets being rated.

SUMMARY

Disclosed is a system and method for rating a security, and in particular, for performing a three stage, double-blind credit rating of a security and/or an asset thereof. In an embodiment, the disclosed system includes a processor and a secure database operably coupled to the processor. The secure database further includes therein a stage one database, a stage two database, and a stage three database. The system includes a rating module operably coupled to the processor that includes a set of instructions executable on the processor for performing a method of rating one or more assets. In an embodiment, the disclosed system and method performs a three stage, double-blind credit rating of a commercial mortgage backed security and/or an asset thereof.

In one aspect, the disclosed system and method may perform an initial rating of a commercial mortgage backed security and/or an asset thereof. In another aspect, the disclosed system and method may perform one or more ratings of a commercial mortgage backed security and/or an asset thereof, which may include, without limitation, an upgrade or a downgrade of a rating of a commercial mortgage backed security and/or an asset thereof. Such upgrade and/or downgrade ratings may be performed subsequent to an initial rating, and/or prior to the issuance of the security and/or asset thereof.

In an embodiment, the method for rating an includes the steps of receiving asset raw data from an applicant, wherein the applicant raw data includes stage one data, stage two data, and stage three data. The stage one data is stored in the stage one database, the stage two data is stored in the stage two database, and the stage three data is stored in the stage three database. A stage one access token is generated, whereupon presentation of the stage one access token grants access to the stage one database. A stage two access token is generated, whereupon presentation of the stage two access token grants access to the stage two database. A stage three access token is generated, whereupon presentation of the stage three access token grants access to the stage three database.

The stage one database is accessed using the stage one access token, and the stage one data is evaluated. The evaluation may be performed by a stage one analyst using appropriate criteria, e.g., objective criteria. The stage one data is evaluated to generate a stage one score, and the stage one score is then stored in the stage two database. The stage two database is accessed using the stage two access token, and the stage two data is evaluated. The evaluation may be performed by a stage two analyst, using appropriate criteria, e.g., objective criteria. The stage two data is evaluated to generate a stage two score, and the stage two score is then stored in the stage three database. The stage three database is accessed using the stage three access token, and the stage three data is evaluated. The evaluation may be performed by a stage three analyst, using appropriate criteria, e.g., objective criteria. The stage three data is evaluated to generate a final rating, and final rating is transmitted to the applicant.

In an embodiment the secure database includes a results database, and a final rating access token is generated. The final rating is stored in the results database and the final rating access token is transmitted to the applicant. The applicant accesses the results database using the final rating access token.

Also disclosed is one or more computer-readable media storing instructions that are executable by a computer and cause the computer to perform a method of rating an applicant in accordance with the present disclosure as described herein.

BRIEF DESCRIPTION OF THE DRAWINGS

Various embodiments of the disclosed system and method are described herein with reference to the drawings wherein.

DETAILED DESCRIPTION

Particular embodiments of the present disclosure are described hereinbelow with reference to the accompanying drawings; however, it is to be understood that the disclosed embodiments are merely exemplary of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more processors or other control devices. Similarly, the software elements of the present invention may be implemented with any programming or scripting language such as C, C++, C#, Java, Javascript, Visual Basic™, COBOL, assembler, PERL, PHP, or the like, with the various algorithms being implemented with any combination of data structures, objects, processes, routines or other programming elements. The object code created can be executed on a variety of operating systems, including without limitation Windows, Macintosh, and/or Linux. Further, it should be noted that the present invention may employ any number of conventional techniques for data transmission, signaling, data processing, network control, and the like.

It should be appreciated that the particular implementations shown and described herein are illustrative of the invention and its best mode, and are not intended to otherwise limit the scope of the present invention in any way. Examples are presented herein which may include sample data items which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships, physical, and/or virtual couplings between the various elements. It should be understood that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices, organic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, a special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

Figure 1:
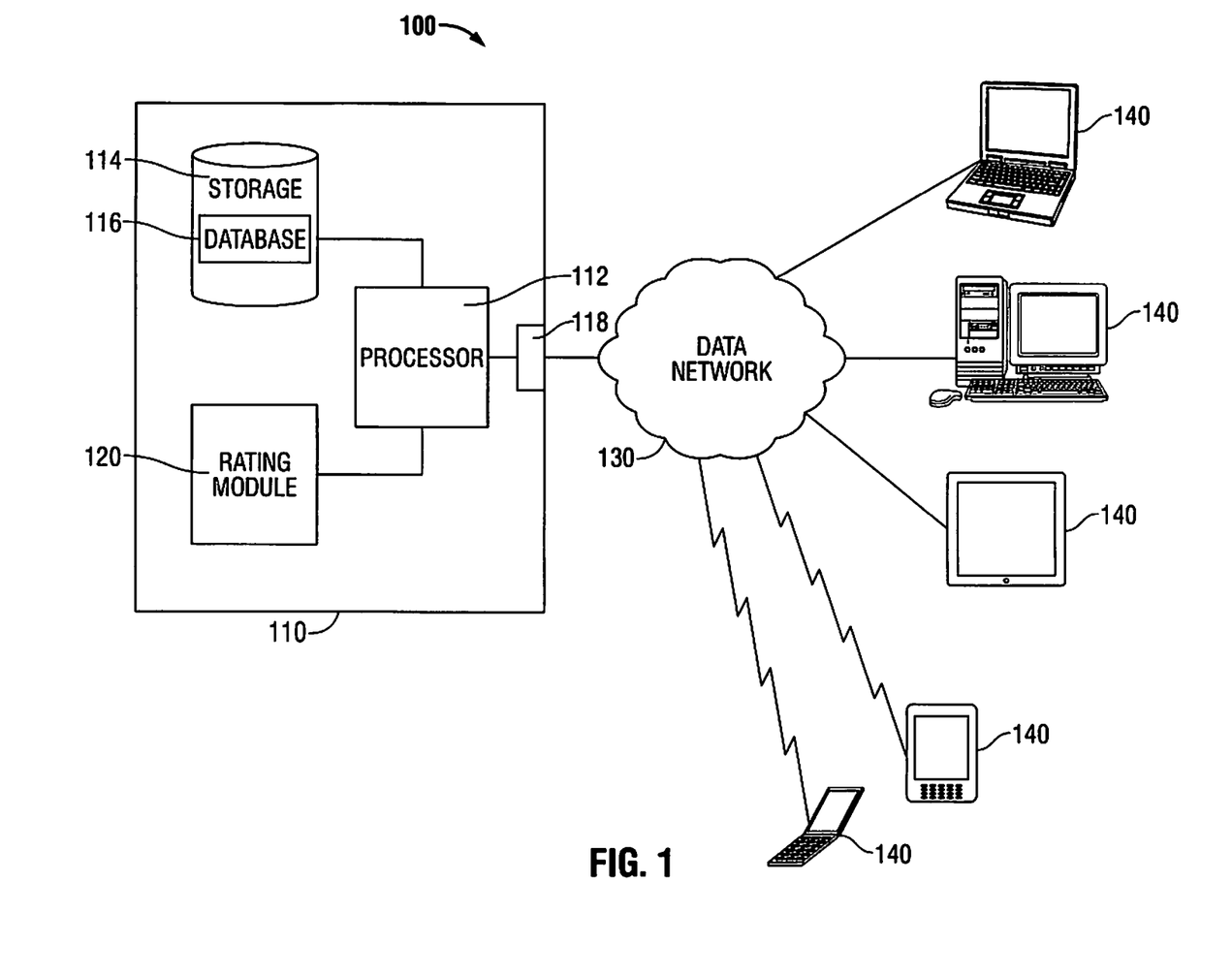
FIG. 1 is a block diagram of an embodiment of a system for double-blind, three stage credit rating process for securities in accordance with the present disclosure.

FIG. 1 illustrates an embodiment of a system 100 for performing a double blind credit rating analysis of a security, e.g., a CMBS. The disclosed embodiment of the system 100 includes a data processing unit 110 that is coupled to one or more user data terminals 140 by a data network 130. Data processing unit includes a processor 112 that is operably associated with a storage unit 114 and a rating module 120. Data network 130 may encompass any suitable data communication link now or in the future known, including without limitation, the public Internet, a local area network (LAN), a wide area network (WAN), and may utilize any suitable signaling protocol and/or transmission media, including without limitation, TCP/IP, Ethernet, fiber optic media, wireless transmission via 802.11 "WiFi", Bluetooth, cellular (e.g., CDMA, GSM) and the like. Processor 112 is operatively coupled to a communication interface 118. Communication interface 118 may support any suitable communication protocol or standard, including without limitation, wired and/or wireless protocols, e.g., wired Ethernet 10BASE-T, 100BASE-T, and/or 1000BASE-T protocols, wireless IEEE 802.11 "WiFi" protocols, and the like. Communications interface 118 operably couples processor 112, storage device 114, and/or rating module 120 to data network 130. Data network 130 may be a private network, a public network, or a combination of a public and private network. Data processing unit 110 may optionally be embodied as a single computer, in a cluster of two or more computers, and/or may be embodied in one or more virtual machines using, e.g., VMware™ or Xenserver™ virtualization.

One or more user data terminals 140 are in communication with data processing unit 110. User data terminal 140 may include any suitable device capable of enabling user interaction with data processing unit 110, and/or with rating module 120 as described in detail herein. For example, and without limitation, user data terminal 140 may include a computing device running the Windows™ operating system sold by Microsoft Corp. of Redmond, Wash., United States (e.g., Windows XP, Windows Vista, Windows 7, Windows CE, and other Windows version), the MacOS and/or IOS operating systems sold by Apple Inc., of Cupertino, Calif., United States, linux, and/or unix. In an embodiment, user data terminal 140 includes a web browser, such as without limitation, Firefox (Mozilla), Internet Explorer, Safari, Opera, Pine, and so forth. User interaction between a user and system 100 may be conducted via any suitable user interface, such as, without limitation, an interface presented in a web browser (e.g., coded in HTML, Javascript, Flash, Ajax, Cold Fusion, and the like), via dedicated application software, by a voice interface, a touchpad interface (e.g., telephone keypad interface), a touchscreen interface, and/or by any suitable user interface capable of facilitating man-machine interaction now or in the future known. The user data terminal 140 may include a biometric authentication device, such as a fingerprint scanner, a retina scanner, voice recognition, and the like. Additionally, optionally, or alternatively, user data terminal 140 may include an automatic identification device, such as without limitation, a barcode scanner, magstripe reader, and/or an RFID tag interrogator.

The system 100 includes rating module 120 that is executable on processor 112 that is configured to perform a method of double-blind rating of a security, e.g., a credit rating of a prospective asset of a CMBS as described herein. The rating module 120 is further configured to accept the input of raw data corresponding to an asset. Such asset may prospectively be considered for inclusion in a CMBS. The raw data is input into rating module 120 by any suitable manner of data input, including without limitation, manual data entry, data download, and/or via data mining (e.g., screen scraping and other common methods of acquiring data from disparate sources). The raw data is segregated into a plurality of subsets, or "stages", each stage being designated for review by an independent analyst. In an embodiment, three such stages are established.

For example, and without limitation, a stage one dataset may include data relating to the identity of the issuer of the securities, the identity of the borrower (mortgagor), the identity of the sponsor(s), the identity of any principals who, directly or indirectly, own or control the sponsor(s), and the identity of any guarantor(s). A stage two dataset may include, without limitation, data relating to the property location. A stage three dataset may include any other relevant data relating to the asset, such as, without limitation, incomes and expenses of the property, rent roll, age of property, physical condition, tenancy, loan-to-value, debt yield and/or debt service coverage ratios, and the like.

After establishing the stage datasets, an access token associated with each stage is generated, which may be a unique string of alphanumeric and/or symbolic characters. Each access token, in turn, is provided to the corresponding stage analyst to faciliate exclusive access to the corresponding stage dataset. Utilizing a user data terminal 140, a stage one analyst provides the required access token to the rating module 120 to obtain access to the stage one dataset only (e.g., the stage one access token provides access to the stage one dataset, but not the stage two or three datasets). The stage one analyst studies the stage one dataset and issues a stage one score thereof based upon objective criteria. In an embodiment, rating module 120 may automatically provide a preliminary rating of each individual data item of the first stage dataset. Additionally or alternatively, rating module 120 may provide a preliminary aggregate rating of all, or at least a portion of, the first stage dataset. The first stage analyst then may adjust the preliminary ratings to arrive at a final stage one score. The final stage one score is communicated to and/or included within the stage two dataset.

A stage two analyst provides the stage two access token to the rating module 120 to access only to the stage two dataset and the final stage one score. The stage two analyst studies the stage two dataset and issues a stage two score thereof based upon objective criteria. Rating module 120 may provide a preliminary rating of each individual data item of the stage two dataset. Additionally or alternatively, rating module 120 may provide a preliminary aggregate rating of all, or at least a portion of, the second stage dataset. The second stage analyst then may adjust the preliminary ratings to arrive at a final stage two score. The final stage one and final stage two scores are communicated to and/or included within the stage three dataset.

A stage three analyst provides the stage three access token to the rating module 120 to obtain access to the stage three dataset, the final stage one score, and the final stage two score. The stage three analyst studies the stage three dataset and provides a score thereof based upon objective criteria. Rating module 120 may provide a preliminary rating of each individual data item within the stage three dataset. Additionally or alternatively, rating module 120 may provide a preliminary aggregate rating of all, or at least a portion of, the third stage dataset. The stage three analyst may adjust the preliminary ratings to arrive at a final stage three score.

Optionally, the stage two and/or the three analyst may respectively present questions to the applicant, e.g., for clarification or to obtain additional information. Such questions are transmitted to the applicant via a sequence of messages that pass through, in the case of the stage three analyst presenting questions, the stage two analyst, the stage one analyst, and finally to the applicant, or, in the case of the stage two analyst presenting questions, through the stage one analyst, and then to the applicant. The applicant's response is recorded and added to the appropriate dataset, e.g., the stage one, stage two, or stage three dataset, whereupon the appropriate analyst will review the updated dataset and, if warranted, updating or revising a corresponding stage score reflecting the additional information received from the applicant. The question and answer cycle may be repeated.

Upon completion of the stage three analysis, the stage three analyst issues a final rating score. The final rating score may be based at least in part on the stage one score and the stage two score. A final rating access token is generated, and is transmitted to the applicant. The applicant may then utilize the final rating access token to obtain access to the final rating score, and, optionally or alternatively, additional analytical material provided by one or more of the analysts.

An access token may be generated in any suitable manner, including without limitation, generation of a random or pseudo-random string, a hash of data elements derived from the applicant data, and may include a checksum character and/or a timestamp. The access token may be human-readable, e.g., enterable by a user via a user interface (keyboard, touch screen, and so forth). Optionally or alternatively, the access token may be operably associated with or encoded onto an authentication device, such as an access card bearing a magnetic strip or barcode, which, in turn, may be read by the user access device 140 to grant the bearer of the authentication device, e.g., an analyst, appropriate access to the corresponding database. In an embodiment, the access token may be associated with a biometric parameter of the analyst assigned to the corresponding database, such that access to the database may only be achieved when the correct biometric credentials (e.g., the analysts' fingerprint, retina scan, or voice scan) is presented to a user access terminal 140.

Figure 2:
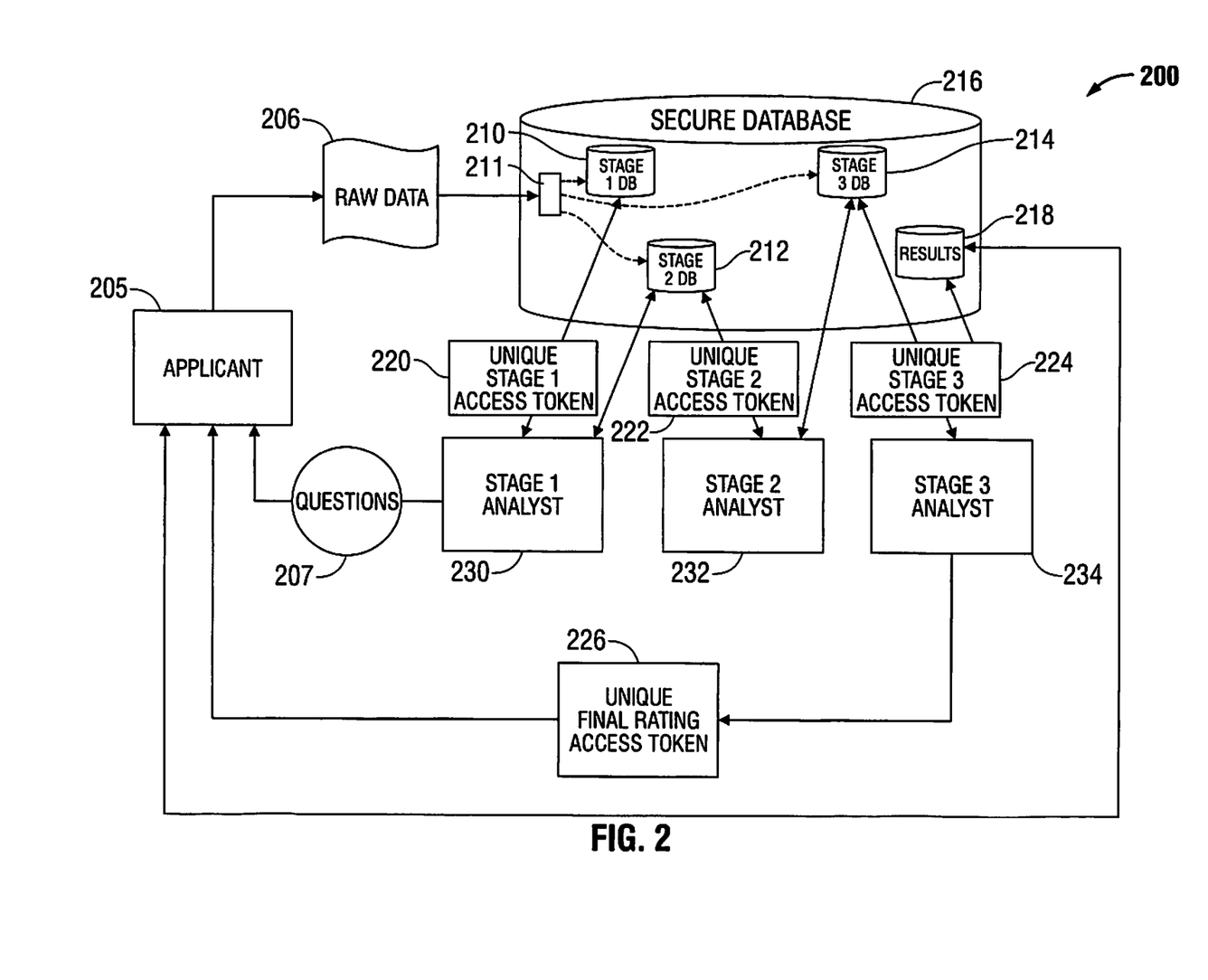
FIG. 2 is a process diagram of an embodiment of a double-blind, three stage credit rating process for securities in accordance with the present disclosure.

Turning to FIG. 2, data and process flows of an embodiment of a double-blind, three stage credit rating system for securities 200 in accordance with the present disclosure are presented. The system 200 includes a secure database 216 having the capability to control or restrict access to data stored therein in response to one or more credentials presented thereto. In an embodiment, secure database 216 includes the capability to restrict access to at least one of read-write, read-only, or write-only (e.g., "drop-box" access) in response to one or more credentials presented thereto. Secure database 216 may include a relational database (e.g., SQLServer, MySQL, Oracle™), a flat file, an indexed file (e.g., Btrieve, ISAM, RMS), or any other suitable data storage architecture having record-oriented random access read and write capability. Secure database 216 includes stage one database 210, stage two database 212, and stage three database 214. The applicant 205 provides raw data 206 representative of the asset, which may be a commercial mortgage loan, being submitted for analysis. The raw data 206, which includes a plurality of data items, is communicated to secure database 216. Each data item communicated to the secure database 216 is then segregated by a classification module 211 into the corresponding stage one, stage two, or stage three database depending upon whether the data items corresponds to a stage one dataset, a stage two dataset, or a stage three dataset, as described hereinabove. In an alternative embodiment, the segregation is performed by the stage one analyst 230. In yet another embodiment, at least a part of the segregation is performed by at least one of classification module 211 and/or the stage one analyst 230.

A database credential, or unique access token, is generated for each stage database 210, 212, 214 of the applicant 205. An analyst must present the correct access token to the system 200, which, in turn, causes the system 200 to grant the appropriate analyst access to the corresponding stage dataset. A stage one token 220 grants stage one analyst 230 access to stage one database 210; a stage two token 222 grants stage two analyst 232 access to stage two database 212; and a stage three token 224 grants stage three analyst 230 access to stage three database 214. The stage three token optionally or additionally enables access by the stage three analyst 234 to a final results database 218 which is configured to store the results of the credit rating process. A unique final results access token 226 is generated which, when presented to the system 200 by the applicant 205, enables access to the final results database 218 by the applicant 205.

Figure 3:
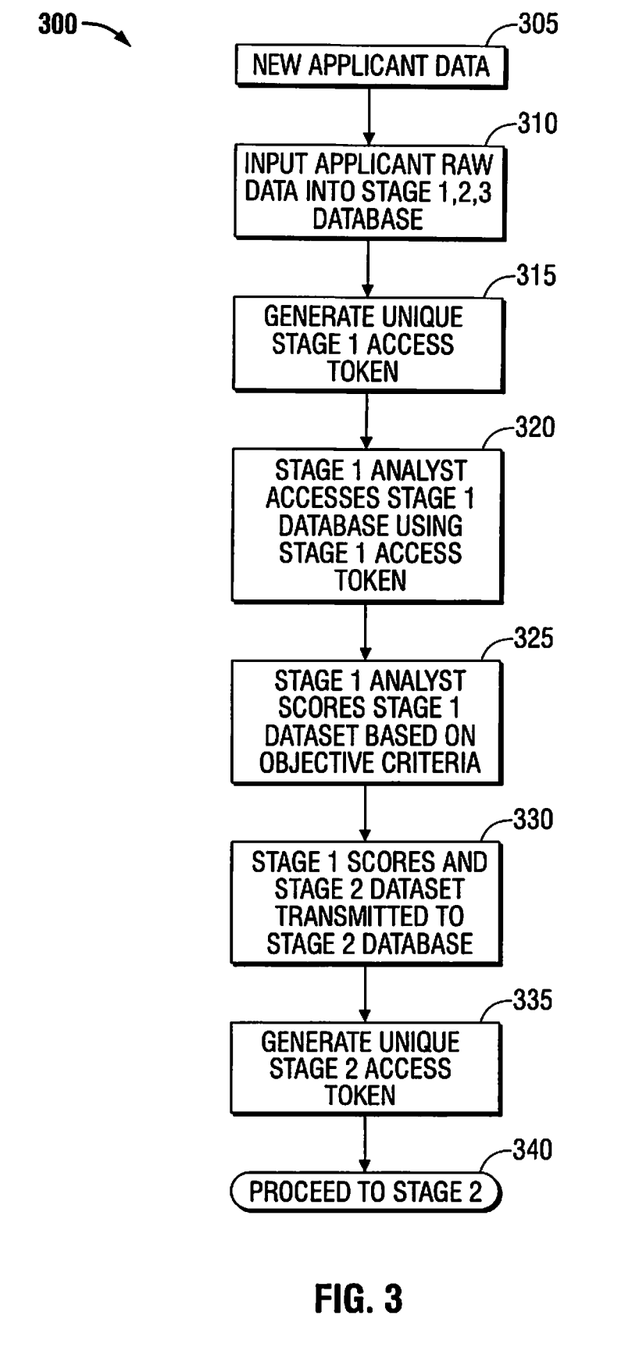
FIG. 3 is a flowchart of an embodiment of a first stage of a three stage credit rating process for securities in accordance with the present disclosure.
Figure 4:
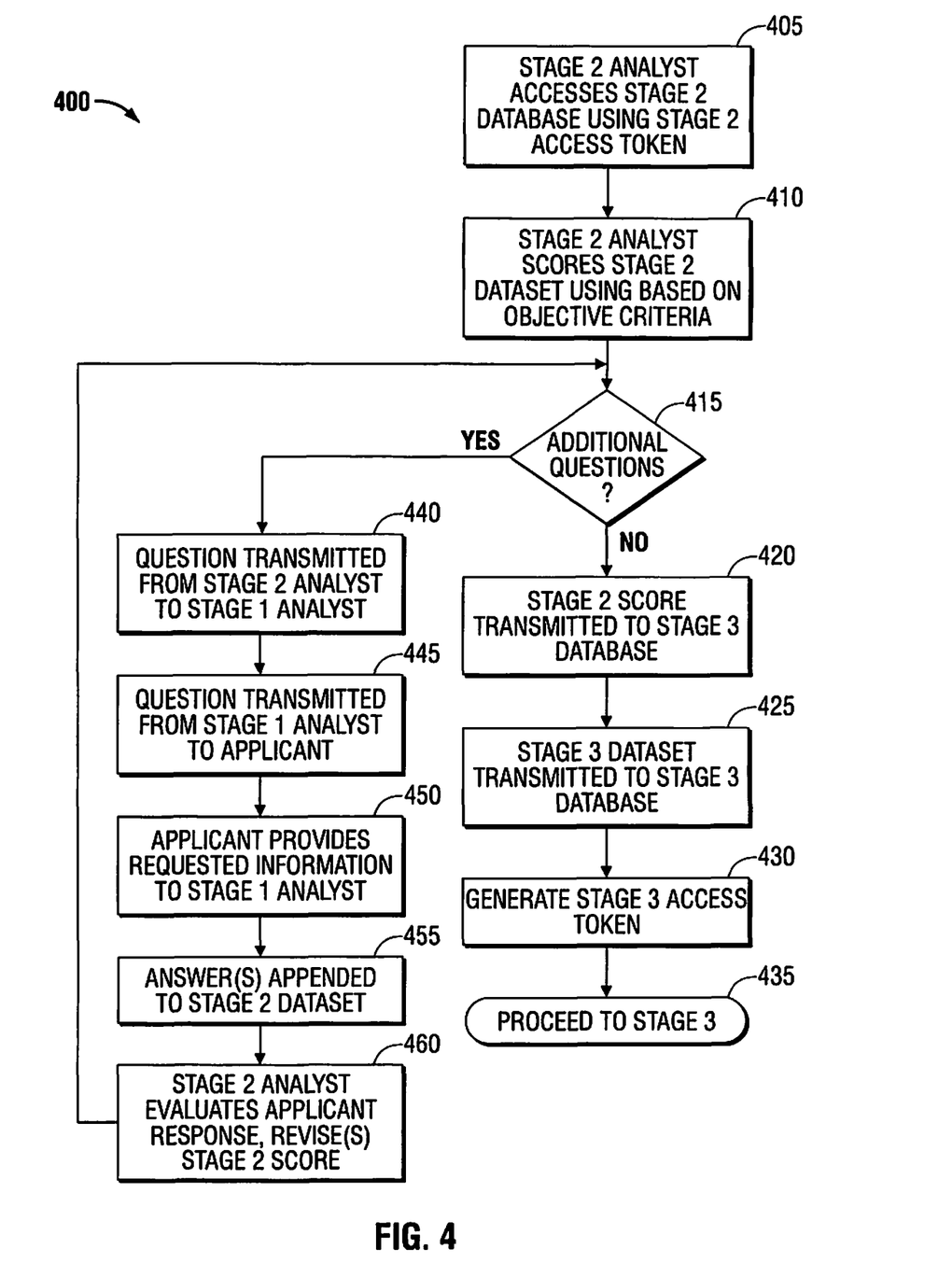
FIG. 4 is a flowchart of an embodiment of a second stage of a three stage credit rating process for securities in accordance with the present disclosure.
Figure 5:
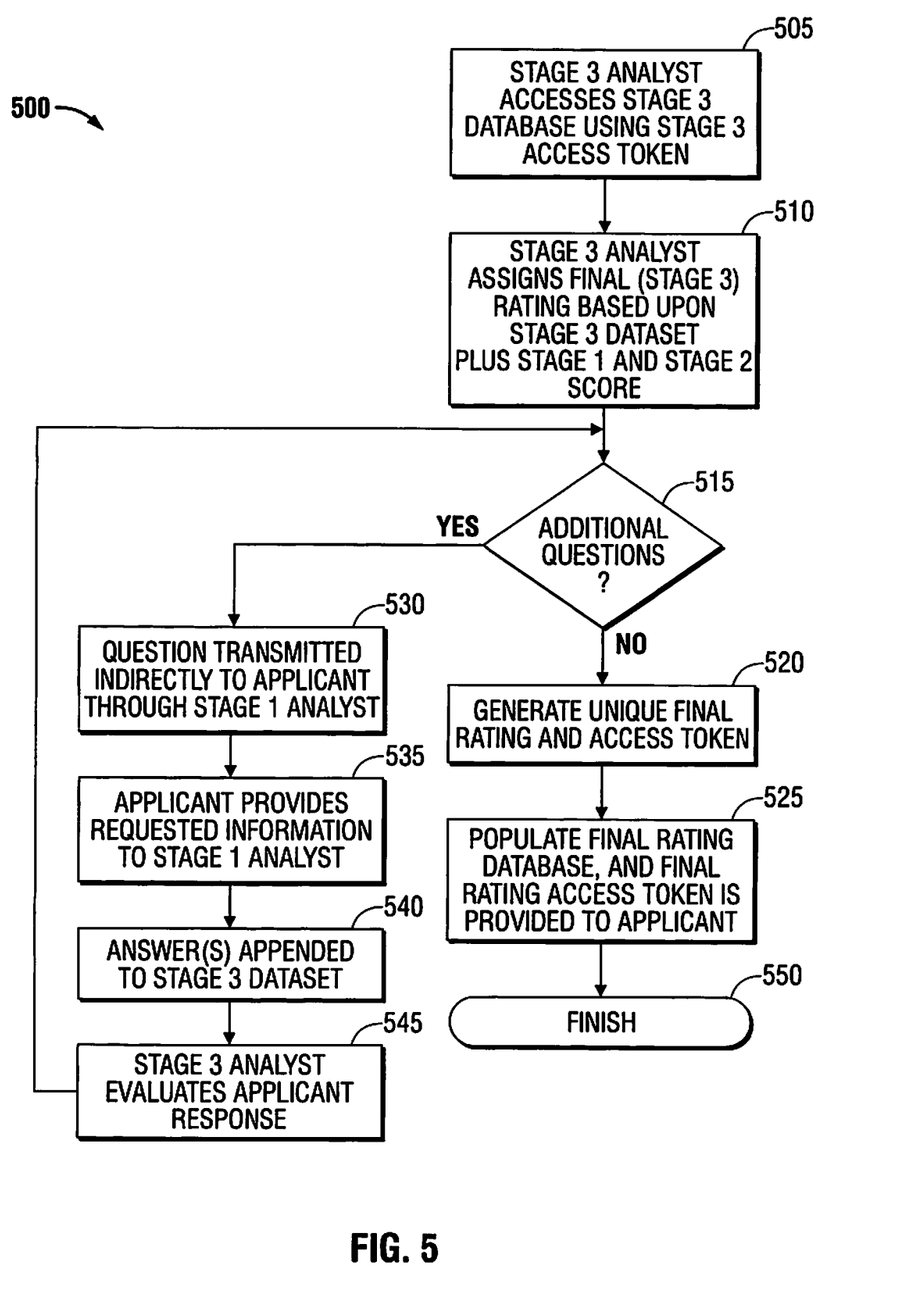
FIG. 5 is a flowchart of an embodiment of a third stage of a three stage credit rating process for securities in accordance with the present disclosure.

Turning now to FIGS. 3, 4, and 5, a method of performing a three stage, double-blind credit rating analysis of a CMBS is presented. In FIG. 3 the stage one process 300 is shown wherein in step 305, applicant raw data received, provided, and/or collected. In step 310, the raw input data is segregated into a stage one database (including e.g., applicant, borrower, sponsor, and guarantor information), a stage two database (including, e.g., geographic, demographic, appraisal, zoning, crime rates, and occupancy information) and a stage three database (including, e.g., property cash flows, rent roll, age of property, physical condition, tenancy, loan-to-value, debt yield, debt service coverage ratios, and ad hoc information as may be required or requested by the third stage analyst).

In step 315, a stage one access token unique to the applicant data is generated. In step 320, a stage one analyst presents the stage one access token to access the stage one database. The stage one analysis is conducted by the stage one analyst in step 325, wherein the stage one data is scrutinized, reviewed, studied, and/or evaluated in accordance with objective criteria to arrive at a stage one rating. The stage one rating may be a single score, or may include a discrete rating for one or more subgroups of the stage one dataset, including without limitation, an applicant score, a sponsorship score, and a guarantor score. The stage one rating is communicated to the stage two database, and to the stage two analyst, in step 330. In step 335, a stage two access token is generated and forwarded to the stage two analyst. Stage one concludes in step 340 whereupon the stage two process 400 commences with step 405.

In step 405, a stage two analyst presents the stage two access token to access the stage two database. The stage two analysis is conducted by the stage two analyst in step 410, wherein the stage two data is scrutinized, reviewed, studied, and/or evaluated in accordance with objective criteria to arrive at a stage two rating. The stage two rating may be a single score, or may include a discrete rating for one or more subgroups of the stage two dataset, including without limitation, a geographic score, a demographic score, a local occupancy rate score, and a crime rate score.

The stage two analyst may optionally inquire of the applicant to obtain additional information therefrom. In step 415 the stage two analyst determines whether further inquiry of the applicant is necessary. If further inquiry is indicated, in the step 440, the inquiry is communicated indirectly to the applicant through the first stage analyst, in order to maintain three stage, double blind anonymity. In an embodiment, the stage two analyst communicates the query to the stage one database using a write-only access mechanism, which enables one way communication from the stage two analyst to the stage one database without exposing the first stage dataset to the stage two analyst. The stage one analyst, having full (read/write) access to the stage one database, then propounds the query to the applicant.

In step 445, the applicant provides a response to the request, which, in turn, is communicated to the stage one analyst. The stage one analyst segregates the information provided in the applicant's answer into the stage two database for analysis by the stage two analyst in step 460. In an embodiment, the applicant's response is communicated as additional raw data that is then segregated into the stage two database accessible to the stage two analyst. Additionally or alternatively, the applicant's response may include data germane to the stage one or stage three dataset. Such additional data may be segregated into the first and/or third stage database as appropriate, whereupon the first and/or this stage analyst may evaluate or re-evaluate the corresponding stage score, which, in turn, is fed forward to the next stage dataset as described herein for consideration by the corresponding subsequent analyst.

In the step 460, the second stage screener evaluates the response received from the applicant, and the process iterates to step 415 wherein the third stage analyst determines whether the applicant's response was sufficient, whether additional inquiries are required, or whether no further questions are necessary. If additional questions are warranted the process iterates to step 440 as described hereinabove. If no additional questions are required, the process continues with step 420 wherein the stage two rating is communicated to the stage three database, and to the stage three analyst. In step 425, the stage three dataset is transmitted to the stage three database. In step 430, a stage three access token is generated and forwarded to the stage three analyst. Stage two concludes in step 435 whereupon the stage three process 500 commences with step 505.

In step 505, a stage three analyst presents the stage three access token to access the stage three database. The stage three analysis is conducted by the stage one analyst in step 510, wherein the stage three data is scrutinized, reviewed, studied, and/or evaluated in accordance with objective criteria to arrive at a preliminary stage three rating. The stage three rating may be a single score, or may include a discrete rating for one or more subgroups of the stage three dataset, including without limitation, a property cash flow score, a rent roll score, a property age and/or physical condition score, a tenancy score, a loan-to-value score, a debt yield score, and a debt service coverage ratio score.

Once a preliminary stage three rating has been established, the stage three analyst may optionally inquire of the applicant to obtain additional information therefrom. In step 515 the stage three analyst determines whether further inquiry of the applicant is necessary. If further inquiry is indicated, in the step 530, the inquiry is communicated indirectly to the applicant through the first stage analyst, in order to maintain three stage, double blind anonymity. In an embodiment, the stage three analyst communicates the query to the stage one database using a write-only access mechanism, which enables one way communication from the third stage analyst to the first stage database without exposing the first stage dataset to the third stage analyst. The first stage analyst, having full (read/write) access to the first stage database, then propounds the query to the applicant.

In step 535, the applicant provides a response to the request, which, in turn, is communicated to the stage one analyst. The stage one analyst segregates the information provided in the applicant's answer into the stage three database for analysis by the stage three analyst in step 540. In an embodiment, the applicant's response is communicated as additional raw data that is then segregated into the third stage database accessible to the third stage screener. Additionally or alternatively, the applicant's response may include data germane to the stage one or stage two dataset. Such additional data may be segregated into the first and/or second stage database as appropriate, whereupon the first and/or second stage analyst may re-evaluate the corresponding stage score, which, in turn, is fed forward to the next stage dataset as described herein for consideration by the corresponding subsequent analyst.

It will be appreciated that during follow-on questioning, the first stage analyst receives the question from the second or third stage analyst. In turn, the first stage analyst forwards the question verbatim to the applicant to be answered. Since the first stage analyst may already know the identity of the applicant, double blindness is not compromised. In embodiments, upon receipt of applicant's response, the first stage analyst may then segregate the data received from the applicant so that, prior to transmitting such information to the second or third stage dataset. In this manner, the data is stripped of any information that might reveal, e.g., the identity of the applicant. The second stage analyst would then segregate the data received from the second stage dataset and strip any information that would reveal, e.g., the location of the property before forwarding to the third stage dataset. The third stage analyst would thereby after receiving the answer to his question still be deprived of any potentially biasing information as to the identity of the applicant or the property location.

In the step 545, the third stage screener evaluates the response received from the applicant, and the process iterates to step 515 wherein the third stage analyst determines whether the applicant's response was sufficient, whether additional inquiries are required, or whether no further questions are necessary. If additional questions are warranted the process iterates to step 530 as described hereinabove. If no additional questions are required, the process continues with step 520 wherein the stage three analyst issues the final credit rating and a final rating access token is generated. In the step 525, the final credit rating, and optionally, additional rating information and assessment data, notes, etc., are transmitted to a results database and the final rating access token is provided to the applicant, which, in turn, enables the applicant to access the results database. Additionally or alternatively, the final rating access token is provided to a third party, e.g., a securities manager, an underwriter, or to a regulatory body, to enable such third parties to access the results database.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. It is contemplated that the steps of a method in accordance with the present disclosure can be performed in a different order than the order provided herein. Therefore, the herein description should not be construed as limiting, but merely as examples of particular embodiments. The claims can encompass embodiments in hardware, software, or a combination thereof.

What is claimed is:

1. A rating system, comprising:
a processor,
a secure database operably coupled to the processor, said secure database including a stage one database, a stage two database, and a stage three database; and
a computer-readable storage medium operably coupled to the processor including instructions which, when executed on the processor, cause the processor to perform a method comprising:
receiving applicant raw data from an applicant, said applicant raw data including stage one data, stage two data, and stage three data;
storing the stage one data in the stage one database, the stage two data in the stage two database, and the stage three data in the stage three database;
generating a stage one access token granting access to the stage one database, generating a stage two access token granting access to the stage two database, and generating a stage three access token granting access to the stage three database;
accessing the stage one database using the stage one access token, evaluating the stage one data to generate a stage one score, and storing the stage one score in the stage two database;
accessing the stage two database using the stage two access token, evaluating the stage two data to generate a stage two score, and storing the stage one score and the stage two score in the stage three database;
accessing the stage three database using the stage three access token and evaluating the stage three data to generate a final rating;
generating a final rating access token; and
transmitting the final rating access token to the applicant to enable the applicant to access the final rating.

2. The rating system in accordance with claim 1, wherein the computer-readable storage medium further includes instructions executable on the processor for:
determining whether additional data is required from the applicant;
transmitting a request for additional data to the applicant if it is determined that additional data is required from the applicant;
receiving additional data from the applicant; and
storing the additional data in a database selected from the group consisting of the stage one database, the stage two database, and the stage three database.

3. The rating system in accordance with claim 2, wherein the transmitting step includes:
storing the request for additional data in the stage two database;
reading the request for additional data from the stage two database using the stage two access token; and
storing the request for additional data in the stage one database.

4. The rating system in accordance with claim 1, wherein the secure database further comprises a results database.

5. The rating system in accordance with claim 4, wherein the computer-readable storage medium further includes instructions executable on the processor for:
storing the final rating in the results database; and
accessing the results database using the final rating access token.

6. The rating system in accordance with claim 1, further comprising a user data terminal in operative communication with the processor.

7. The rating system in accordance with claim 6, wherein the user data terminal further includes a biometric authentication device.

8. The rating system in accordance with claim 1, further comprising:
segregating the applicant raw data in to stage one data, stage two data, and stage three data.

9. The rating system in accordance with claim 8, wherein the segregating step is performed by a stage one analyst.

10. A computer-implemented method for rating an asset, comprising the steps of:
receiving, at a processor, applicant raw data relating to the asset, said applicant raw data including stage one data, stage two data, and stage three data;
storing the stage one data in a stage one database in operable communication with the processor, storing the stage two data in a stage two database in operable communication with the processor, and storing the stage three data in a stage three database in operable communication with the processor;
generating, at the processor, a stage one access token granting access to the stage one database, generating, at the processor, a stage two access token granting access to the stage two database, and generating, at the processor, a stage three access token granting access to the stage three database;
accessing, at a user access terminal, the stage one database using the stage one access token, evaluating the stage one data to generate a stage one score, and storing the stage one score in the stage two database;
accessing, at a user access terminal, the stage two database using the stage two access token, evaluating the stage two data to generate a stage two score, and storing the stage one score and the stage two score in the stage three database;
accessing, at a user access terminal, the stage three database using the stage three access token and evaluating the stage three data to generate a stage three score;
generating, at the processor, a final rating access token; and
delivering, via a communication interface, the final rating access token to the applicant to enable the applicant to access the stage three score.

11. The computer-implemented method for rating an asset in accordance with claim 10, further comprising the steps of:
determining whether additional data is required from the applicant;
transmitting, via a communication interface, a request for additional data to the applicant if it is determined that additional data is required from the applicant;
receiving, at the processor, additional data from the applicant; and
storing the additional data in the stage three database.

12. The computer-implemented method for rating an asset in accordance with claim 11, wherein the transmitting step includes:
storing the request for additional data in the stage two database;
reading the request for additional data from the stage two database using the stage two access token; and
storing the request for additional data in the stage one database.

13. The computer-implemented method for rating an asset in accordance with claim 10, further comprising the steps of:

storing the final rating in a results database; and accessing the results database using the final rating access token.

14. The computer-implemented method for rating an asset in accordance with claim 10, further comprising:

segregating the applicant raw data into stage one data, stage two data, and stage three data.

15. The computer-implemented method for rating an asset in accordance with claim 14, wherein the segregating step is performed by a stage one analyst.

16. Non-transitory computer-readable media storing instructions, which, when executed by a processor, cause the processor to perform a method of rating an asset, the method comprising:

receiving applicant raw data from an applicant, said applicant raw data including stage one data, stage two data, and stage three data;

storing the stage one data in a stage one database, the stage two data in a stage two database, and the stage three data in a stage three database;

generating a stage one access token granting access to the stage one database, generating a stage two access token granting access to the stage two database, and generating a stage three access token granting access to the stage three database;

accessing the stage one database using the stage one access token, evaluating the stage one data to generate a stage one score, and storing the stage one score in the stage two database;

accessing the stage two database using the stage two access token, evaluating the stage two data to generate a stage two score, and storing the stage one score and the stage two score in the stage three database;

accessing the stage three database using the stage three access token and evaluating the stage three data to generate a stage three score;

generating a final rating access token; and transmitting the final rating access token to the applicant to enable the applicant to access the stage three score.

17. The non-transitory computer-readable media of claim 16, the method further comprising the steps of:

determining whether additional data is required from the applicant;

transmitting a request for additional data to the applicant if it is determined that additional data is required from the applicant;

receiving additional data from the applicant; and storing the additional data in a database selected from the group consisting of the stage one database, the stage two database, and the stage three database.

18. The non-transitory computer-readable media of claim 17, wherein the transmitting step includes:

storing the request for additional data in the stage two database;

reading the request for additional data from the stage two database using the stage two access token; and storing the request for additional data in the stage one database.

19. The non-transitory computer-readable media of claim 16, wherein the method further comprises the steps of:

storing the final rating in a results database; and accessing the results database using the final rating access token.

20. The non-transitory method for rating an asset in accordance with claim 14, wherein the method further comprises the step of segregating the applicant raw data in to stage one data, stage two data, and stage three data.

* * * * *